(No Model.)
3 Sheets—Sheet 1.
G. O. GILMER.
ROTARY SHEARS.
No. 322,440. Patented July 21, 1885.
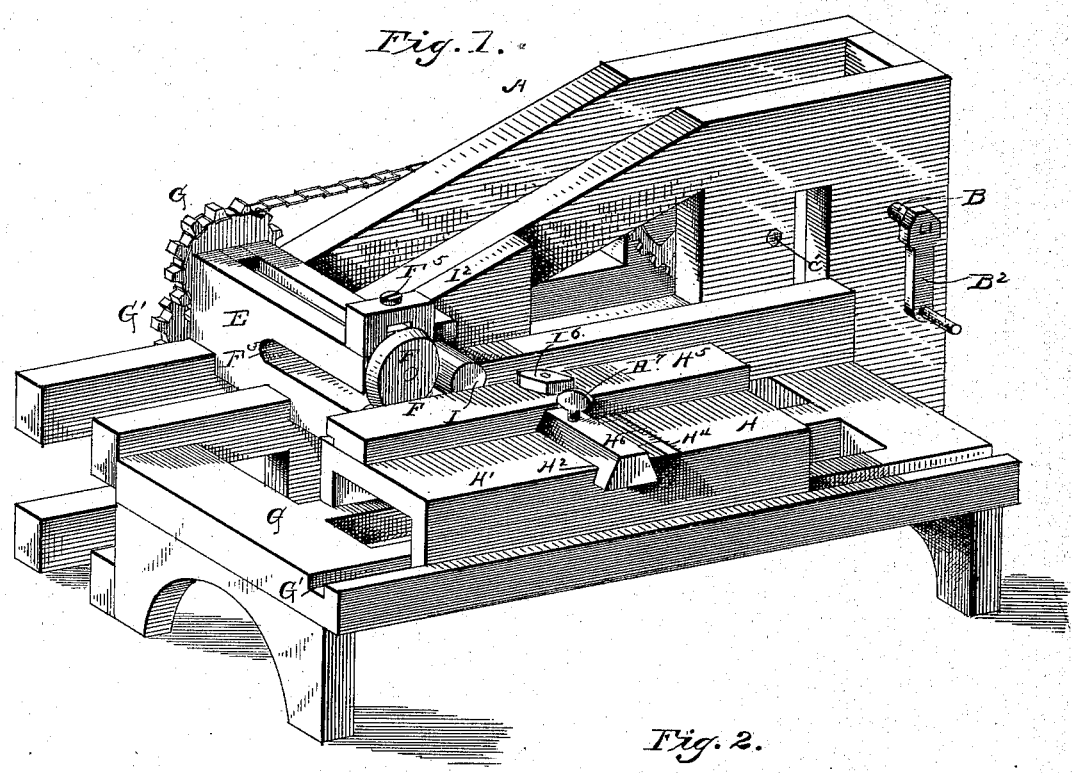
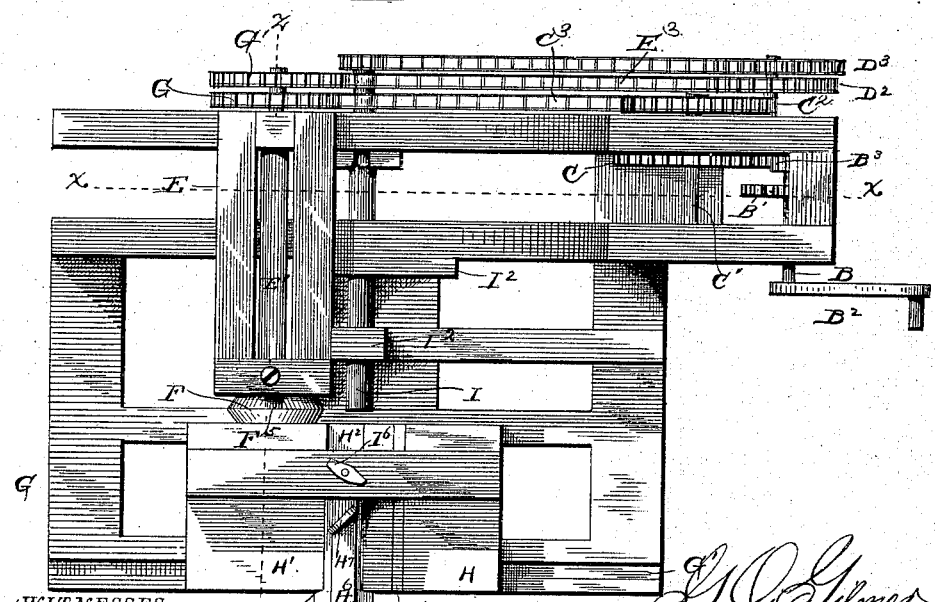

(No Model.)  G. O. GILMER.  3 Sheets—Sheet 2.
ROTARY SHEARS.

No. 322,440.  Patented July 21, 1885.

(No Model.) 3 Sheets—Sheet 3.

G. O. GILMER.
ROTARY SHEARS.

No. 322,440. Patented July 21, 1885.

WITNESSES
INVENTOR
Attorneys

UNITED STATES PATENT OFFICE.

GEORGE O. GILMER, OF CLARKSVILLE, TENNESSEE.

ROTARY SHEARS.

SPECIFICATION forming part of Letters Patent No. 322,440, dated July 21, 1885.

Application filed September 16, 1884. (No model.)

*To all whom it may concern:*

Be it known that I, GEORGE O. GILMER, a citizen of the United States, residing at Clarksville, in the county of Montgomery and State of Tennessee, have invented a new and useful Improvement in Rotary Shears, of which the following is a specification, reference being had to the accompanying drawings.

My invention relates to rotary cutters or shears for cutting boiler-iron and sheet-iron; and it consists in the construction and novel arrangement of parts, as will be hereinafter fully described, and particularly pointed out in the claims.

Figure 3:
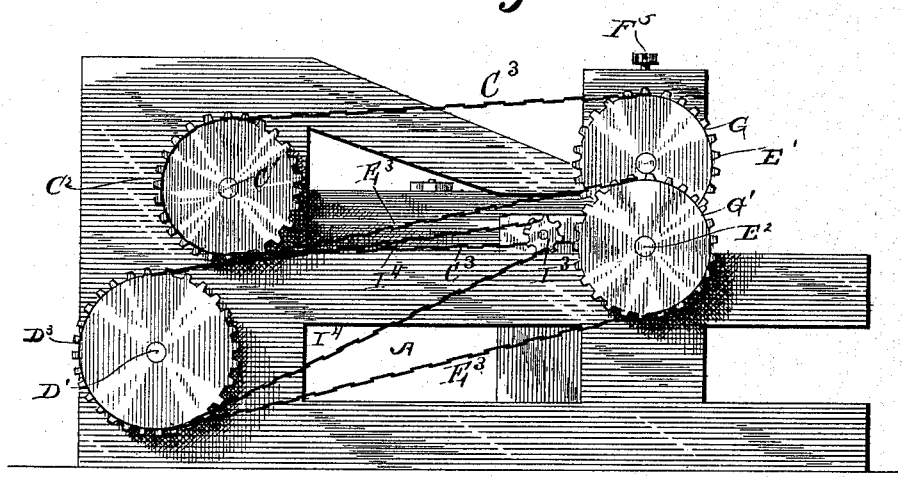
Figure 4:
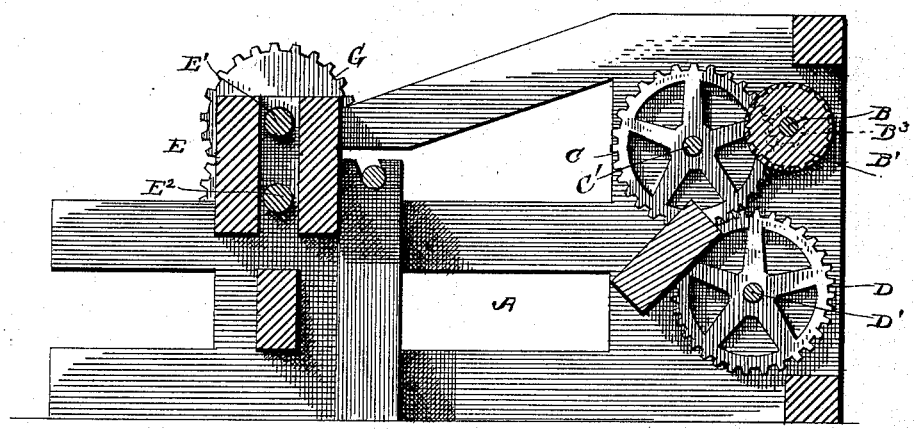
Figure 5:
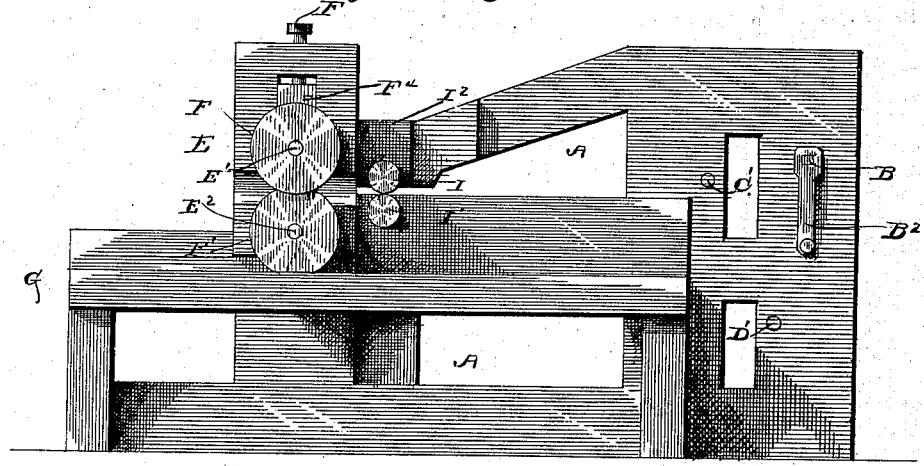
Figure 6:
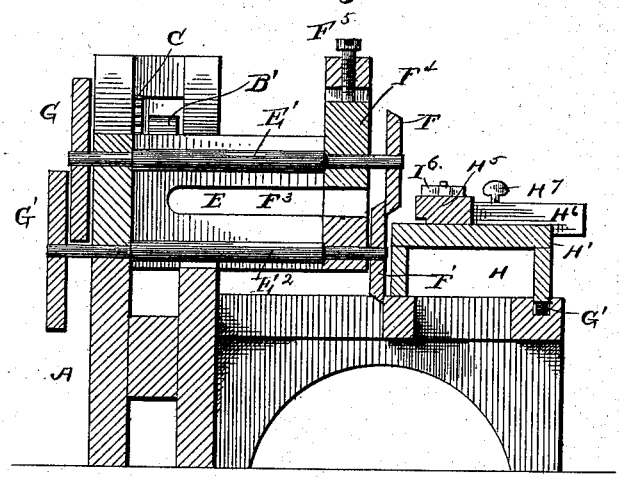
Figure 7:
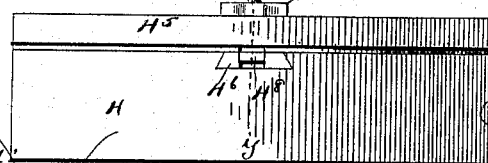

In the drawings, Figure 1 is a view in perspective of a shearing-machine embodying my improvements. Fig. 2 is a plan view. Fig. 3 is a side elevation, and Fig. 4 is a vertical longitudinal sectional view on the line $x\ x$ in Fig. 2. Fig. 5 is a side elevation of the machine with the rolling feed table removed. Fig. 6 is a vertical transverse sectional view taken on the line $z\ z$ of Fig. 2. Fig. 7 is a side elevation of the rolling table from the inner side. Fig. 8 is a detailed sectional view taken on the line $y\ y$ of Fig. 7.

Referring by letter to the accompanying drawings, A designates the frame of the machine, and B is the driving-shaft, which is provided with a sprocket-wheel, B', and a crank, $B^2$, so that the machine may be driven by power or by hand, as may be desired. The driving-shaft B is provided with a pinion, $B^3$, which engages a gear-wheel, C, on a shaft, C', which latter is provided outside of the frame with sprocket-wheel $C^2$. The teeth of the gear-wheel C engage the teeth of a gear-wheel, D, on a shaft, D', and the shaft D' is provided outside of the frame A with a double sprocket-wheel, $D^2\ D^3$, the larger portion, $D^3$, of this double wheel being farthest from the frame of the machine.

E represents a rectangular metallic frame, that is bolted transversely near one end of the bed-frame A. In the frame E, near the lower side thereof, is journaled a shaft, $E^2$, to the inner end of which is fixed a circular rotary cutter, F', having a beveled cutting edge or rim. A sprocket-wheel, G', is fixed to the outer end of the shaft $E^2$, and is connected with the sprocket-wheel $D^2$ on the shaft D' by an endless sprocket-chain, $E^3$. In one end of the frame E, near the upper side thereof, and at the other in a block, $F^4$, that is secured in the inner end of the frame, is journaled a shaft, E', to the inner end of which is fixed a circular rotary cutter, F, similar to the cutter F'; and to the outer end of the said shaft is fixed a sprocket-wheel, G, that is connected to the wheel $C^2$ on the shaft C' by an endless sprocket-chain $C^3$. A set-screw, $F^5$, bears upon the upper side of the vertically-movable block $F^4$, and by this means the upper cutter is rendered adjustable with reference to the lower cutter, so as to enable the cutters to shear iron plates of different thicknesses. Horizontal open-ended slots $F^3$ are made in the sides of the frame E, through which slots passes the plate of iron as it is being fed to the cutters.

The bed G of the frame A is provided with a groove, G', which forms a guide or track for the rolling table H, which is mounted on rollers which run in the groove G'. The bed H' of the rolling table H is provided with a transverse dovetail groove, $H^2$, at one side of which, upon the face of the table, is marked off a graduated scale or rule, $H^4$, by which to gage the width of the cut or shear of the plates. The edges of the rotary cutters F F' are beveled in opposite directions, the largest diameters of the cutters being nearest together, thereby forming the cutting-edges of the shears. In the frame A, on the inner side of the frame E, is journaled a roller-shaft, I', one end of which projects out into line with the rotary cutters. To the outer end of the shaft I' is fixed a sprocket-pinion, $I^2$, that is connected to the sprocket-wheel $D^3$ on the shaft D' by an endless sprocket-chain, $I^4$. Above the roller I' is journaled a similar roller, I, in blocks $I^2$, secured to the frame A. The plates of iron, after they pass the rotary cutters, pass between the rollers I and I', which smooth the rough and uneven edge left by the cutters.

By removing the crank $B^2$ and substituting therefor a driving-pulley on the shaft B the machine may be driven by steam or other power.

The bed G of the table H is provided with a straight edge, $H^5$, which is secured to a tongue, $H^6$. This tongue $H^6$ is provided with a set-screw, $H^7$, by which to hold the straight edge to its adjustments. A clamp, $H^8$, is provided in the end of the tongue $H^6$, and this clamp works in a recess, $H^9$, in the tongue $H^6$. The stem $I^5$ of the clamp $H^8$ is threaded and passes up through the straight edge, and the projecting end of said stem $I^5$ receives a thumb-nut, $I^6$, by which the clamp is tightened to hold the plate to be sheared in place.

Having thus fully described my invention, what I claim as new, and desire to secure by Letters Patent of the United States, is—

1. The combination, with the main frame provided with the driving-shaft having a pinion and sprocket-wheel, the shaft $D'$, having gear-wheel $D$ and double sprocket-wheel $D^2$ $D^3$, the shaft $C'$, having gear-wheel $C$ and sprocket-wheel $C^2$, of the auxiliary frame having slot $F^3$, the adjustable rotary shaft $E$, provided with the cutter $F$ at one end and the sprocket-wheel $G$ at the other end, and the shaft $E^2$, having the cutter $F'$ and the sprocket-wheel $G^2$, and the chains connecting the sprocket-wheels, substantially as described.

2. The combination, with the main frame and auxiliary frame carrying the rotary cutters, and mechanism, substantially as described, for operating the rotary cutters, of the smoothing-rollers, and mechanism, substantially as described, for operating them, as specified.

3. The combination, with the main frame provided with the driving-shaft having a pinion, sprocket-wheel, and crank-handle, the shaft $D'$, having gear-wheel $D$ and double sprocket-wheel $D^2 D^3$, the shaft $C'$, having gear-wheel $C$ and sprocket-wheel $C^2$, of the auxiliary frame, rotary shears, and smoothing rollers, and the rolling-table $H$, provided with groove $H^2$, the scale $H^4$, the sliding tongue, the straight edge, and the clamp, its threaded stem and thumb-nut, substantially as specified.

4. The combination, with the auxiliary frame secured upon the main frame, and provided with the bevel-edge rotary cutters, and the smoothing-rolls, of mechanism, substantially as described, for operating the cutters and rolls, substantially as specified.

5. The combination of the frame $E$, the rotary cutters having the beveled edges, the shaft of one of said cutters being journaled in the frame, the vertically-adjustable block $F^4$ in the frame, one end of the shaft of one of the cutters being journaled in said block and the set-screw bearing on the upper side of the block, substantially as described.

6. The combination of the main frame, the frame $E$, the rotary cutters journaled in said frame $E$, the rolling or sliding table on the bed of the main frame, the straight edge having the tongue extending at right angles therefrom, said tongue being dovetailed in the sliding or rolling table, and the set-screw for clamping the tongue to the table, substantially as described.

In testimony that I claim the foregoing as my own I have hereto affixed my signature in presence of two witnesses.

GEORGE O. GILMER.

Witnesses:
R. H. BURNEY,
C. H. BAILEY.